United States Patent
Jesson et al.

(10) Patent No.: US 10,717,167 B2
(45) Date of Patent: Jul. 21, 2020

(54) MACHINING TEMPLATE

(71) Applicant: Rolls-Royce North American Technologies, Inc., Indianapolis, IN (US)

(72) Inventors: David A. Jesson, Brownsburg, IN (US); Daniel James Hassan, III, Noblesville, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 197 days.

(21) Appl. No.: 15/727,929

(22) Filed: Oct. 9, 2017

(65) Prior Publication Data

US 2018/0099370 A1    Apr. 12, 2018

Related U.S. Application Data

(60) Provisional application No. 62/406,181, filed on Oct. 10, 2016.

(51) Int. Cl.
| | | |
|---|---|---|
| *B23C 9/00* | (2006.01) | |
| *B23Q 35/42* | (2006.01) | |
| *B23B 47/28* | (2006.01) | |
| *B23D 69/02* | (2006.01) | |
| *B24B 27/033* | (2006.01) | |

(52) U.S. Cl.
CPC ............. *B23Q 35/42* (2013.01); *B23B 47/28* (2013.01); *B23C 9/00* (2013.01); *B23D 69/02* (2013.01); *B24B 27/033* (2013.01)

(58) Field of Classification Search
CPC ....... B23Q 35/42; B23B 47/28; B24B 27/033; B23D 69/02; B23C 9/00; Y10T 29/49996
See application file for complete search history.

(56) References Cited

U.S. PATENT DOCUMENTS

| | | | | |
|---|---|---|---|---|
| 3,987,712 A | * | 10/1976 | Croteau | ............... B23Q 35/42 409/131 |
| 4,230,164 A | * | 10/1980 | Mericle | ............... B23Q 35/42 144/144.1 |
| 6,050,799 A | * | 4/2000 | Galyon | ............... B29C 73/025 264/36.21 |

(Continued)

*Primary Examiner* — Bayan Salone
(74) *Attorney, Agent, or Firm* — Shumaker & Sieffert, P.A.

(57) ABSTRACT

An example tool includes a body configured to be secured to a substrate, and a template on or in the body. The template defines at least one of a nominal or a maximum material-removal region. An example assembly includes a substrate defining an aperture, and the tool, including the body secured to the substrate. The nominal material-removal region or the maximum material-removal region are substantially aligned with a respective nominal periphery or a maximum periphery of the aperture. An example technique for machining the substrate includes securing the body of the tool to the substrate. The technique includes substantially aligning the nominal or the maximum material-removal region defined by the template with the respective nominal or the respective maximum periphery of the aperture. The technique includes removing material from the substrate only from a region defined by the nominal or maximum material-removal region.

20 Claims, 5 Drawing Sheets

(56) References Cited

U.S. PATENT DOCUMENTS

| | | | |
|---|---|---|---|
| 7,722,318 B2* | 5/2010 | Addis | B23P 6/005 415/148 |
| 2004/0126197 A1* | 7/2004 | Allemann | B23C 5/10 409/182 |
| 2008/0251154 A1* | 10/2008 | Gill | B23B 47/28 144/84 |
| 2010/0320344 A1* | 12/2010 | Choi | F21V 21/08 248/229.26 |
| 2011/0110783 A1* | 5/2011 | Addis | B23P 6/005 416/219 R |
| 2011/0255928 A1* | 10/2011 | Ferreras | B23B 47/28 408/115 B |
| 2012/0195705 A9* | 8/2012 | Gowker | B23B 47/28 408/72 B |
| 2012/0211548 A1* | 8/2012 | Clark | B23P 6/005 228/119 |
| 2012/0304433 A1* | 12/2012 | Roux | B29C 73/04 29/402.09 |
| 2015/0108301 A1* | 4/2015 | Troy | B25H 3/00 248/206.5 |
| 2016/0273235 A1* | 9/2016 | Davidian | E04G 23/0207 |

* cited by examiner

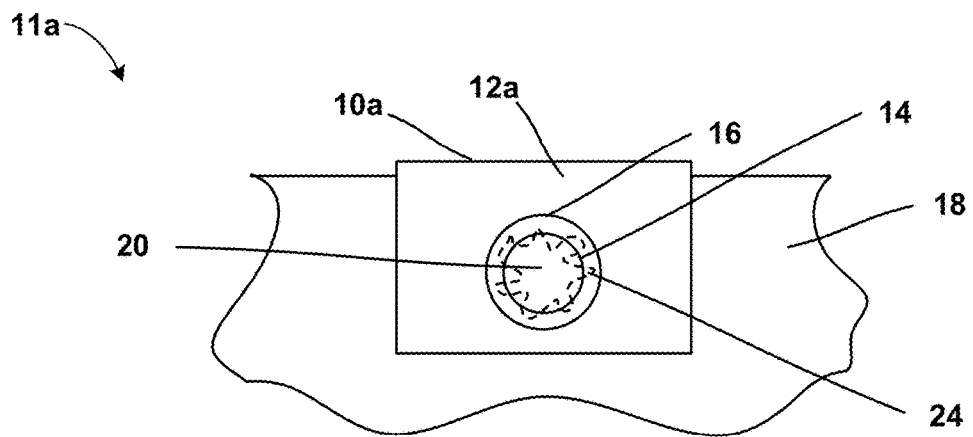
FIG. 1A
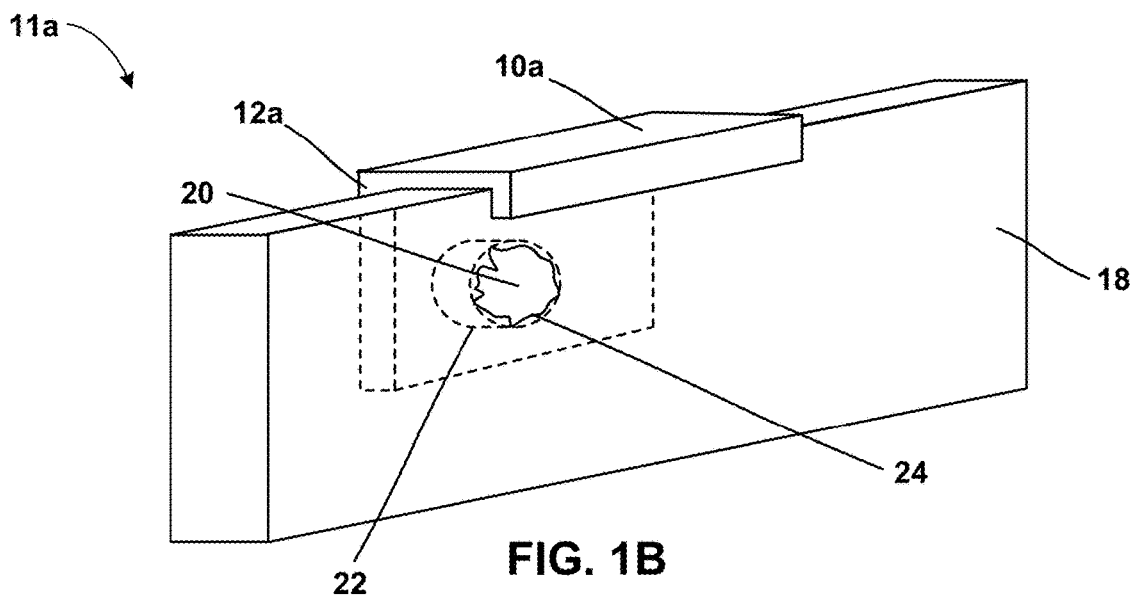
FIG. 1B
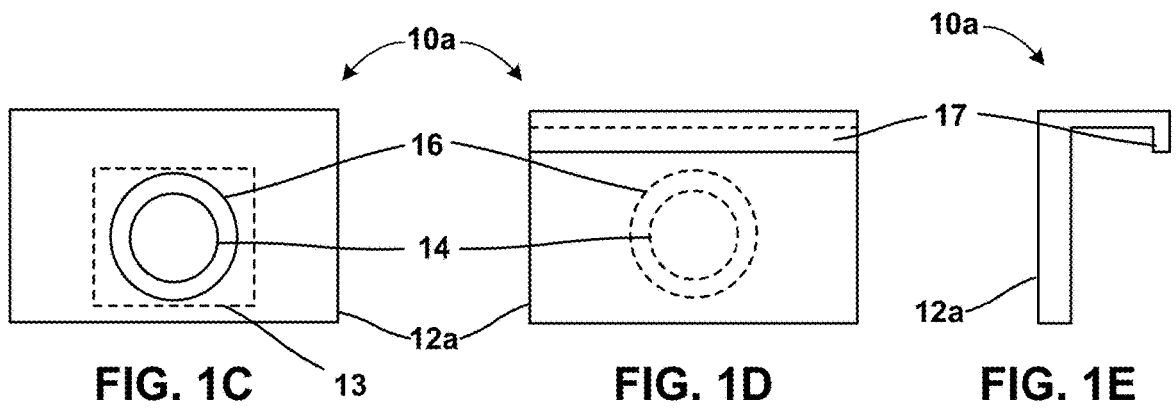
FIG. 1C    FIG. 1D    FIG. 1E

MACHINING TEMPLATE

This application claims the benefit of U.S. Provisional Application No. 62/406,181 filed Oct. 10, 2016, which is incorporated herein by reference in its entirety.

TECHNICAL FIELD

The present disclosure generally relates to tools including templates for machining substrates.

BACKGROUND

Metal or alloy materials are widely used for construction, transportation, and for industrial applications. Some metal or alloy materials are susceptible to corrosion. Corrosion may include transformation of a metal or an alloy by a chemical or electrochemical reaction. For example, corrosion may include one or more of oxidation, hydroxylation, or sulfidation. A part including a metal or an alloy may be susceptible to corrosion, depending on the working environment and the operating characteristics of the part. For example, humidity may accelerate corrosion.

Corrosion may degrade the structural integrity of components. For example, component parts may become susceptible to erosion, cracking, fracture, pitting, or disintegration, that may affect the geometry of a bulk or a surface of the component. For example, corrosion may result in surface roughness or irregularity, or other changes in geometric dimensions of components.

SUMMARY

In some examples, the disclosure describes an example tool. The example tool includes a body configured to be secured to a substrate. The example tool includes a template on or in the body. The template defines at least one of a nominal or a maximum material-removal region. The example tool may be used for machining the substrate.

In some examples, the disclosure describes an example assembly. The example assembly includes a substrate defining an aperture. A region of the substrate adjacent the aperture may exhibit corrosion. The assembly includes a tool. The tool includes a body secured to the substrate, and a template on or in the body. The template defines at least one of a nominal material-removal region or a maximum material-removal region substantially aligned with a respective nominal periphery or a maximum periphery of the aperture.

In some examples, the disclosure describes an example technique. The example technique includes securing a body of a tool to a substrate. The substrate defines an aperture. The tool defines a template on or in the body. The technique includes substantially aligning a nominal or a maximum material-removal region defined by the template with a respective nominal or a respective maximum periphery of the aperture. The technique includes removing material from the substrate only from a region defined by the nominal or maximum material-removal region.

The details of one or more examples are set forth in the accompanying drawings and the description below. Other features, objects, and advantages will be apparent from the description and drawings, and from the claims.

BRIEF DESCRIPTION OF DRAWINGS

FIG. 1A is a conceptual and schematic block diagram illustrating a front view of a portion of an example assembly including an example tool and a substrate including an aperture.

FIG. 1B is a conceptual and schematic block diagram illustrating a perspective view of the example assembly of FIG. 1A.

FIG. 1C is a conceptual and schematic block diagram illustrating a front view of the example tool of FIG. 1A including a template.

FIG. 1D is a conceptual and schematic block diagram illustrating a rear view of the example tool of FIG. 1C.

FIG. 1E is a conceptual and schematic block diagram illustrating a side view of the example tool of FIG. 1C.

DETAILED DESCRIPTION

Figure 2A:
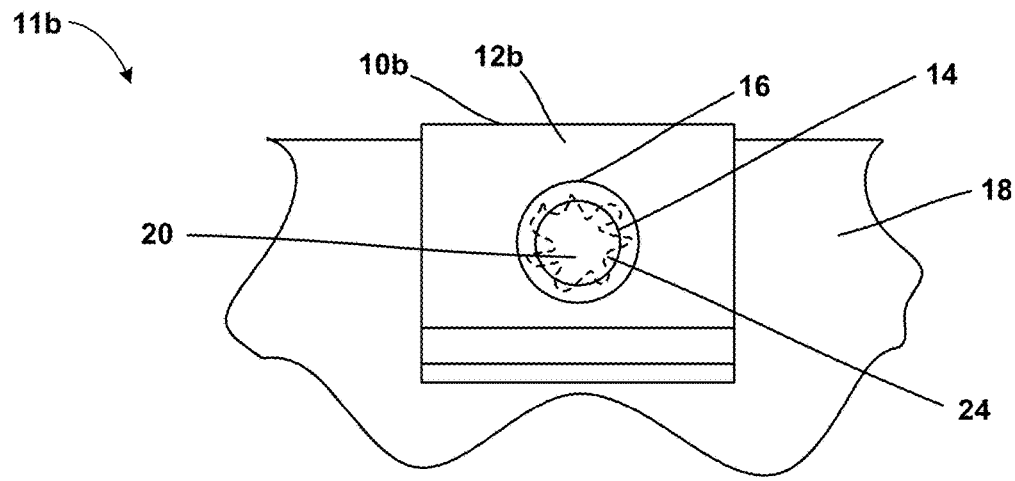
FIG. 2A is a conceptual and schematic block diagram illustrating a front view of a portion of an example assembly including an example tool and a substrate including an aperture.

The disclosure describes example tools for machining substrates. In some examples, the machining may include dressing corroded or worn substrates, for example, industrial components, to remove corroded or worn regions adjacent apertures of the substrates. In some examples, a substrate may be machined (for example filed, drilled or routed) in a region that is adjacent to or includes the aperture of the substrate to remove corroded or worn material adjacent the aperture to restore the aperture to a nominal geometry. However, the machining may result in accidental or unintentional removal of material from beyond the intended region, which may cause unacceptable deviation in a periphery of the aperture. In examples in which the material properties of the substrate are subject to precise specifications, for example, predetermined microstructural, phase, or metallurgical properties, it may not be possible to mitigate the accidental removal, and the substrate may no longer adhere to operating specifications. Thus, improper machining of the substrate in an attempt to dress the aperture may require the entire substrate to be replaced.

Example tools, assemblies, and techniques according to the disclosure may be used to machine substrates while facilitating material removal from only a predetermined region of the substrate, while substantially leaving other regions of the substrate intact. In some examples, an example tool may include a template defining a nominal or maximum material-removal region. In some examples, the example tool may be secured to a substrate including an aperture such that the template is substantially aligned with the aperture. Material may be removed from the substrate, for example, by filing, drilling, or routing, only from a region defined by the nominal or maximum material-removal region, while leaving other regions of the substrate intact. Thus, example tools, assemblies, and techniques according to the disclosure may maintain the integrity of the substrate allowing subsequent use in intended operating environments.

FIG. 1A is a conceptual and schematic block diagram illustrating a front view of a portion of an example assembly 11a including an example tool 10a and a substrate 18 including an aperture 20. FIG. 1B is a conceptual and schematic block diagram illustrating a perspective view of example assembly 11a of FIG. 1A. Substrate 18 may include or be part of an industrial or construction component, for example, an automobile, an airplane, an aerospace vehicle, a train, a transport, a machine, a structural component, a load-bearing component, or any other component. In some examples, substrate 18 may include a material that may exhibit corrosion or wear, for example, one or more of a metal, an alloy, a glass, a plastic, a ceramic, or the like. For example, substrate 18 may include poly(methyl methacrylate) (PMMA).

Aperture 20 may include any aperture defined in substrate 18 by design, for example, an aperture that receives a component or a fastener. While aperture 20 is shown as having a circular cross-section in the example assembly 11a of FIG. 1A, in other examples, aperture 20 may have any suitable geometry, for example, having piecewise circular, ellipsoidal, curved, linear, curvilinear, or polygonal cross-section. In some examples, a surface of substrate 18 may define a periphery 24 of aperture 20. In some examples, periphery 24 may have a shape substantially similar to a cross-section of aperture 20, as shown in FIGS. 1A and 1B. In other examples, periphery 24 may have a different shape from a cross-section of aperture 20, for example, resulting from modification to periphery 24 by wear or corrosion. In some examples, aperture 20 may extend through a thickness of substrate 18, for example, forming a channel 22 as shown in FIG. 1B. In some examples, channel 22 may define substantially a uniform major dimension across the thickness of the substrate. In other examples, the major dimension or cross-section of channel 22 may change through the thickness of the substrate.

In some examples, substrate 18 may experience corrosion, for example, adjacent to aperture 20. In some examples, substrate 18 may exhibit, in addition to or instead of corrosion, wear adjacent aperture 20, for example, thermal wear or mechanical wear. In some examples, the corrosion or wear may result from operating substrate 18 in a working environment, for example via one or more of abrasion, erosion, fatigue, creep, spallation, cracking, electrochemical corrosion, oxidation, or rusting. In some examples, periphery 24 of aperture 20 may include at least a corroded or worn portion of substrate 18. The corrosion or wear may distort, shift, migrate or otherwise change a boundary or configuration of aperture 20 from a nominal periphery to periphery 24. For example, the nominal periphery may be defined by a periphery of aperture 20 before corrosion or wear commenced, for example, the periphery of aperture 20 as designed or as fabricated.

Tool 10a may be used to guide removal of material from substrate 18, for example, corroded or worn material, to substantially restore periphery 24 of aperture 20 to the nominal periphery or a periphery beyond the nominal periphery but within or up to a maximum periphery larger than the nominal periphery. For example, tool 10a may facilitate removal of material from only a predetermined region adjacent aperture 20 to restore periphery 24 to the nominal periphery, or to a periphery within or up to the maximum periphery, while leaving other adjacent regions of substrate 18 intact by avoiding removal of material from regions outside the predetermined region. In examples in which at least a portion of periphery 24 is narrower than the nominal periphery (for example, because of wear or corrosion causing a radially inward migration of material of substrate 18 relative to the nominal periphery), periphery 24 may be restored to the nominal periphery by removing material only from a region bound by the nominal periphery.

In some examples, it may not be possible to restore periphery 24 to the nominal periphery, for example, because a portion of periphery 24 may be substantially widened or enlarged compared to the nominal periphery, such that further removal of material from a region of substrate 18 adjacent periphery 24 would result in additional deviation from the nominal periphery. However, in some such examples, it may be possible to restore periphery 24 to a periphery between the nominal periphery and a maximum periphery, for example a maximum periphery that is larger than nominal periphery 24, that may yet maintain aperture 20 within predetermined operating characteristics or specifications. For example, the nominal periphery may be defined by a first circular circumference, and the maximum periphery may be defined by a second circular circumference that is larger than the first circular circumference. In examples in which at least a portion of periphery 24 is wider than the nominal periphery (for example, because of wear or corrosion causing a radially outward migration of material of substrate 18 relative to the nominal periphery), periphery 24 may be restored to a periphery beyond the nominal periphery but within or extending up to the maximum periphery by removing material only from a region bound by the maximum periphery. In some examples, restoration of aperture 20 to the nominal periphery may result in accidental or unintended removal of material beyond the nominal periphery. In such examples, material may be further removed from substrate 18 so that periphery 24 is restored to the maximum periphery.

In some examples, tool 10a may be used to guide restoration of a first portion of periphery 24 to the nominal periphery, a second portion of periphery 24 to the maximum periphery, and maintain a third portion of periphery 24 unaltered.

FIG. 1C is a conceptual and schematic block diagram illustrating a front view of example tool 10a of FIG. 1A including a template 13. FIG. 1D is a conceptual and schematic block diagram illustrating a rear view of example tool 10a of FIG. 1C. FIG. 1E is a conceptual and schematic block diagram illustrating a side view of example tool 10a of FIG. 1C. Tool 10a may include at least one of a rigid, semi-rigid, or soft material. For example, tool 10a may include at least one of plastic, wood, glass, rubber, paper, metal, non-woven material, or a fabric.

Tool 10a includes body 12a configured to be secured to substrate 18. In some materials, body 12a may include the same material as tool 10a. In some examples, different portions of tool 10a may be fabricated from different materials. For example, body 12a may include a first material, and another component or region of tool 13 may include another material. In some examples, one or both of tool 10a or body 12a may include a material that does not wear, scratch, or otherwise damage substrate 18. For example, at least a surface of one or both of tool 10a or body 12a that contacts a surface of substrate 18 may include a material that is softer than substrate 18. For example, in examples in which substrate 18 includes a first metal or alloy, tool 10a or body 12a may include a second metal or alloy that is softer than the first metal or alloy. In some examples, one or both of tool 10a or body 12a may be at least partially flexible or otherwise conformable to a surface of substrate 18 that defines aperture 20, so that body 12a may be secured in close contact with the surface of substrate 18 defining aperture 20. In some examples, one or both of tool 10a or body 12a may include a tacky or adhesive surface, or a surface that may grip substrate 18 to prevent relative motion between body 12a and substrate 18 after body 12a is secured to substrate 18.

Body 12a may include template 13. Template 13 may guide the removal of material from a predetermined region of substrate 18. For example, template 13 may be used to guide removal of material from only a region of substrate 18 adjacent aperture 20 defining a periphery between the nominal periphery or the maximum periphery, while avoiding the removal of material from other regions of substrate 18.

When body 12a of tool 10a is secured to substrate 18, template 13 may be substantially aligned with aperture 20. For example, template 13 may be aligned with aperture 20 before, during, or after securing body 12a to substrate 18 using visual or tactile feedback to locate the respective positions of aperture 20 and template 13, and moving one or both of body 12a and substrate 18 to substantially align aperture 20 and template 13. Aperture 20 and template 13 may be considered to be substantially aligned, for example, when a center of aperture 20 is substantially aligned with a center or predetermined pattern of template 13, or when a periphery 24 of aperture 20 is substantially aligned with a predetermined region or pattern of template 13. For example, template 13 may include alignment features, for example, lines, curves, or polygons, that may be registered with complementary features of substrate 18 to align template 13 with aperture 20.

In some examples, template 13 is on or in body 12a. For example, a major surface of body 12a may define template 13. In some examples, template 13 may be defined within a bulk of body 12a. For example, at least a region of body 12a including template 13 may be transparent or translucent, and template 13 within the bulk of body 12a may be visible through body 12a. In some examples, body 12a may be translucent or transparent.

Template 13 may define at least one of a nominal material-removal region 14 or a maximum material-removal region 16. In some examples, a boundary of nominal material-removal region 14 may substantially conform to a nominal periphery of aperture 20, and a boundary of maximum material-removal region 16 may substantially conform to a maximum periphery of aperture 20. In some examples, a boundary of nominal material-removal region 14 is configured to substantially align with a nominal periphery of aperture 20, for example, when body 12a is secured to substrate 18. In some examples, a boundary of maximum material-removal region 16 is configured to substantially align with a maximum periphery of aperture 20, for example, when body 12a is secured to substrate 18. In some examples, maximum material-removal region 16 may be larger than nominal material-removal region 14. In some examples, one or both of nominal material-removal region 14 and maximum material-removal region 16 may be translucent or transparent. In some examples, nominal material-removal region 14 or maximum material-removal region 16 may define a sacrificial region of tool 10a or 10b to be removed with the material of substrate 18, for example, with a material of substrate 18 in a vicinity of aperture 20.

In some examples, one or both of nominal material-removal region 14 or maximum material-removal region 16 may include at least one of visible markings or tactile markings. For example, the visible markings may include continuous or intermittent lines, edges, or curves defined by visual contrast media such as ink, pigments, or dyes. In some examples, the visible markings may provide visual contrast against a surface of body 12a, for example, via differences in optical properties such as reflection, transmission, refraction, or diffusion compared to the surface of body 12a. In some examples, the tactile markings may include continuous or intermittent features that are cut into body 12a or are depressed relative to a surface of body 12a, for example, one or more of edges, grooves, channels, fluting, pits, holes, or depressions having a curvilinear or polygonal boundary. In some examples, the tactile markings may include continuous or intermittent features that project from a surface of body 12a or are otherwise raised relative to a surface of body 12a, for example, one or more of ridges, edges, mesas, plateaus, or raised features having curvilinear or polygonal boundary. In some examples, the tactile markings may be detected by an operator by touch, for example, by providing a sufficient tactile feedback to indicate the presence and extent of the tactile markings. In some examples, the tactile markings may additionally also be visible, for example, by providing a visual contrast against a surface of body 12a via differences in optical properties such as reflection, transmission, refraction, diffusion compared to the surface of body 12a. In some examples, body 12a defines one or more windows defining template 13. For example, an edge of one or more windows may define at least one of nominal material-removal region 14 or maximum material-removal region 16. In some examples, the visible or tactile markings may either indicate an area extending through nominal material-removal region 14 or maximum material-removal region 16, or a respective boundary nominal material-removal region 14 or maximum material-removal region 16.

In some examples, tool 10a may further include a clip 17 configured to secure body 12a to substrate 18, for example, as shown in FIGS. 1D and 1E. For example, clip 17 may include an overhang or a lip configured to align with an edge or peripheral region of substrate 18, for example, as shown in FIG. 1B. In some examples, clip 17 may define a surface that is complementary to a region of substrate 18, such that body 12a may be secured to substrate 18 via clip 17. In some examples, clip 17 may include a fastener, for example, a bolt, a screw, a nut, or other mechanical fastener. In some examples, clip 17 may include a snap-fit or shrink-fit region that may be snapped onto or fit onto a region of substrate 18. In some examples, clip 17 may include at least one magnet configured to secure body 13 to substrate 18. For example, substrate 18 may include a magnetic region adjacent aperture 20, and clip 17 may magnetically fasten to substrate 18. In some examples, substrate 18 may not be magnetic, or may only be weakly magnetic, and clip 17 may include a first one or more magnet disposed adjacent a first surface of substrate 18, while a second one or more magnet is disposed adjacent a second surface of substrate 18 opposite the first surface may be magnetically bound to the first plurality of magnetics to secure body 12a to substrate 18.

Figure 2B:
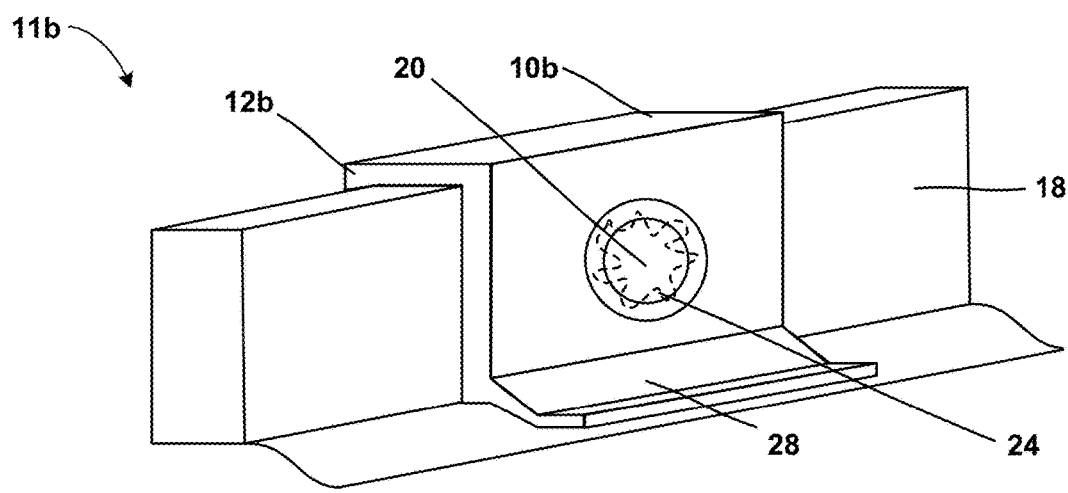
FIG. 2B is a conceptual and schematic block diagram illustrating a perspective view of the example assembly of FIG. 2A.

In some examples, example tools according to the disclosure may include an extended lip, for example, as shown in FIGS. 2A to 2E. FIG. 2A is a conceptual and schematic block diagram illustrating a front view of a portion of an example assembly 11b including an example tool 10b and substrate 18 including aperture 20. FIG. 2B is a conceptual and schematic block diagram illustrating a perspective view of example assembly 11b of FIG. 2B. Tool 10b and body 12b of example assembly 11b may be substantially similar to tool 10a and body 12a of example assembly 11a described with reference to FIGS. 1A to 1E aside from the differences described herein.

Figure 2C:
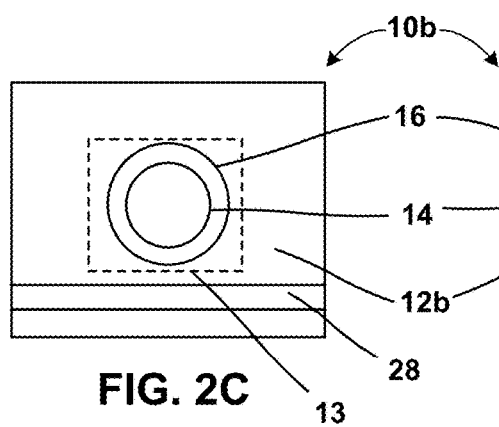
FIG. 2C is a conceptual and schematic block diagram illustrating a front view of the example tool of FIG. 2A including a template.
Figure 2D:
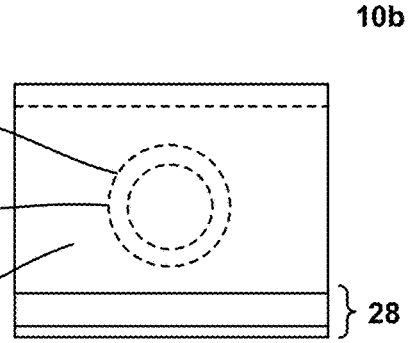
FIG. 2D is a conceptual and schematic block diagram illustrating a rear view of the example tool of FIG. 2C.
Figure 2E:
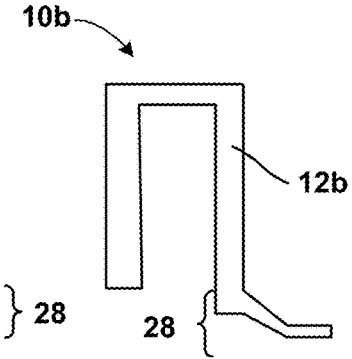
FIG. 2E is a conceptual and schematic block diagram illustrating a side view of the example tool of FIG. 2C.

FIG. 2C is a conceptual and schematic block diagram illustrating a front view of example tool 10b of FIG. 2A including template 13. FIG. 2D is a conceptual and schematic block diagram illustrating a rear view of example tool 10b of FIG. 2C. FIG. 2E is a conceptual and schematic block diagram illustrating a side view of example tool 10b of FIG. 2C.

In some examples, unlike tool 10a of FIGS. 1A-1E, tool 10b further includes an extended lip 28 extending from body 12b, for example, as shown in FIGS. 2C and 2D. Extended lip 28 may substantially conform to a surface of substrate 18, to provide an additional contact region to secure body 12b to substrate 18, for example, as shown in FIG. 2D. Additionally, extended lip 28 may provide protection to substrate 18, e.g., from a machining tool used to remove material form substrate 18. Extended lip 28 may be made of materials similar to those described with reference to body 12a of tool 10a. In some examples, extended lip 28 may be unitary with body 12b, and may include the same material as body 12b. In some examples, extended lip 28 may include a material that is different from a material of body 12b.

Example tools 10a or 10b may be fabricated using any suitable fabrication technique, for example, including one or more of casting, molding, injection molding, machining, milling, stamping, welding, cutting, additive manufacturing, or subtractive manufacturing. For example, the geometry and configuration of tools 10a or 10b, body 12a or 12b, and template 13 may be determined to be complementary to the geometry and configuration of substrate 18, aperture 20, and periphery 24. In some examples, the geometry and configuration and tools 10a and 10b may be determined based on a digital representation of substrate 18. In some examples, the digital representation may be defined by imaging substrate 18 and aperture 20. For example, custom tools 10a or 10b may be fabricated based on a particular sample of substrate 18. However, in other examples, tools 10a or 10b may be fabricated based on a blueprint or manufacturing design of substrate 18 rather than the actual substrate 18.

Thus, example tools 10a or 10b described with reference to FIGS. 1A to 2E may be used to guide restoration of periphery 24 of aperture 20 to a nominal or maximum periphery, or to a periphery between the nominal or maximum periphery, without damaging or altering other regions of substrate 18. Example techniques for machining substrate 18 using techniques including tools 10a or 10b are described below.

Figure 3:
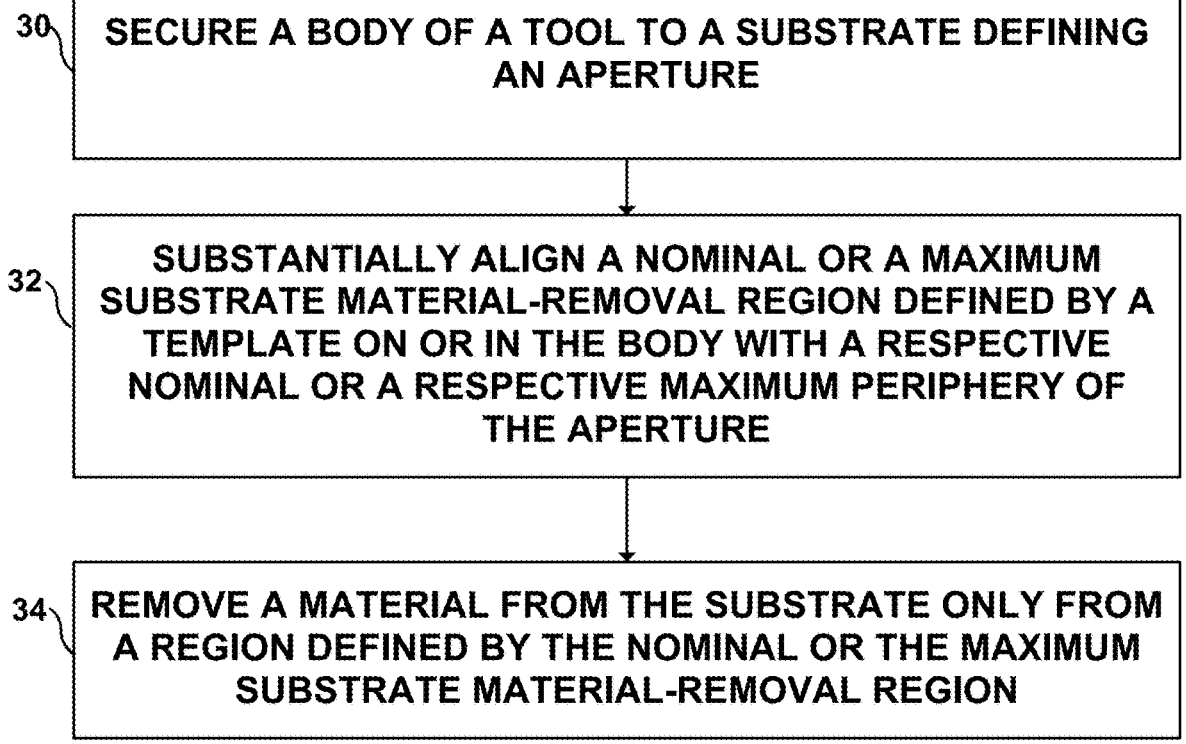
FIG. 3 is a flow diagram illustrating an example technique for machining a substrate.

FIG. 3 is a flow diagram illustrating an example technique for machining substrate 18. While the example technique of FIG. 3 is described with reference to example assemblies 11a and 11b, and example tools 10a and 10b, example techniques of FIG. 3 may be implemented using any example assemblies or tools according to the disclosure.

In some examples, the example technique of FIG. 3 includes securing body 12a or 12b of tool 10a or 10b to substrate 18 (30). Body 12a or 12b may be substantially immobile relative to substrate 18 after the securing 30, for example, immobile at least until material is removed from substrate 18. For example, the securing 30 may include removably or reversibly securing body 12a or 12b to substrate 18. In some examples, the securing 30 may include clipping, fastening, snap-fitting, adhering, or magnetically binding body 12a or 12b to substrate 30.

In some examples, the example technique of FIG. 3 includes substantially aligning nominal material-removal region 14 or maximum material-removal region 16 defined by template 13 of body 12a or 12b with a respective nominal or a respective maximum periphery of aperture 20 (32). In some examples, the aligning (32) may include moving one or both of substrate 18 and body 12a or 12b relative to each other to substantially align a center of aperture 20 with a center of template 13. In some examples, the aligning (32) may include aligning registration features of template 13 with complementary features of substrate 18. The aligning 32 may be performed manually, for example, by an operator, or automatically, for example, by a robot or tool that images at least template 13 and aperture 20, and manipulates the relative position or configuration of tool 10a or 10b and substrate 18 to align template 13 with aperture 20. While in the example technique of FIG. 3, the aligning (32) is shown after the securing (30), in some examples, the aligning (32) may be performed before, during, or with the securing. For example, the securing (30) and the aligning (32) may include a series of alignments and securements to progressively improve alignment between template 13 and aperture 20.

In some examples, the example technique of FIG. 3 includes removing material from substrate 18 only from a region defined by nominal material-removal region 14 or maximum material-removal region 16 (34). In some examples, the removing material 34 may include filing, drilling, routing, or otherwise performing subtractive machining on substrate 18 within only a region defined by nominal material-removal region 14 or maximum material-removal region 16 (34). In some examples, the removing material (34) may further include removing material from tool 10a or 10b, from example, from a region of body 12a or 12b bound by nominal material-removal region 14 or maximum material-removal region 16. For example, nominal material-removal region 14 or maximum material-removal region 16 may define a sacrificial region of tool 10a or 10b to be removed with the material of substrate 18 during the removing of material (34). In some examples, the removing material (34) may include at least one of visually or tactilely comparing nominal material-removal region 14 or maximum material-removal region 16 with periphery 24 to avoid removing material of substrate 18 from beyond nominal material-removal region 14 or maximum material-removal region 16.

Thus, the example technique of FIG. 3 may be used to machine substrate 18, for example, to remove material from only a predetermine region adjacent aperture 20 to restore aperture 20 to the nominal or maximum periphery.

EXAMPLES

Example 1

Figure 4A:
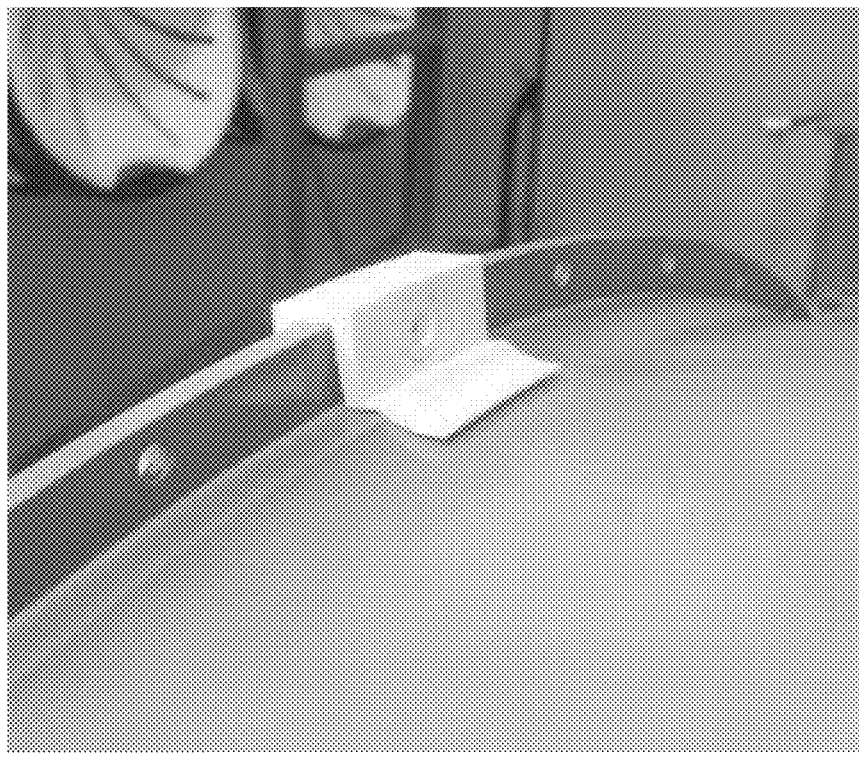
FIG. 4A is a photograph illustrating a perspective view of an assembly including an example tool and a substrate.
Figure 4B:
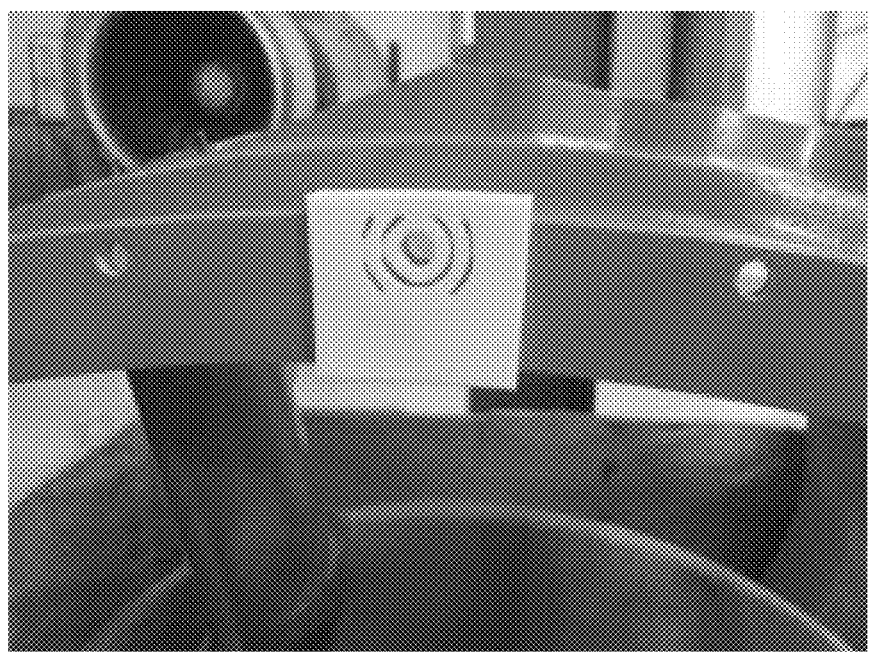
FIG. 4B is a photograph illustrating a front view of the assembly of FIG. 4A.

FIG. 4A is a photograph illustrating a perspective view of an assembly including an example tool and a substrate. FIG. 4B is a photograph illustrating a front view of the assembly of FIG. 4A. The substrate includes an engine front-frame assembly including magnesium. The tool was fabricated by additive manufacturing (3D printing).

Example 2

Figure 5A:
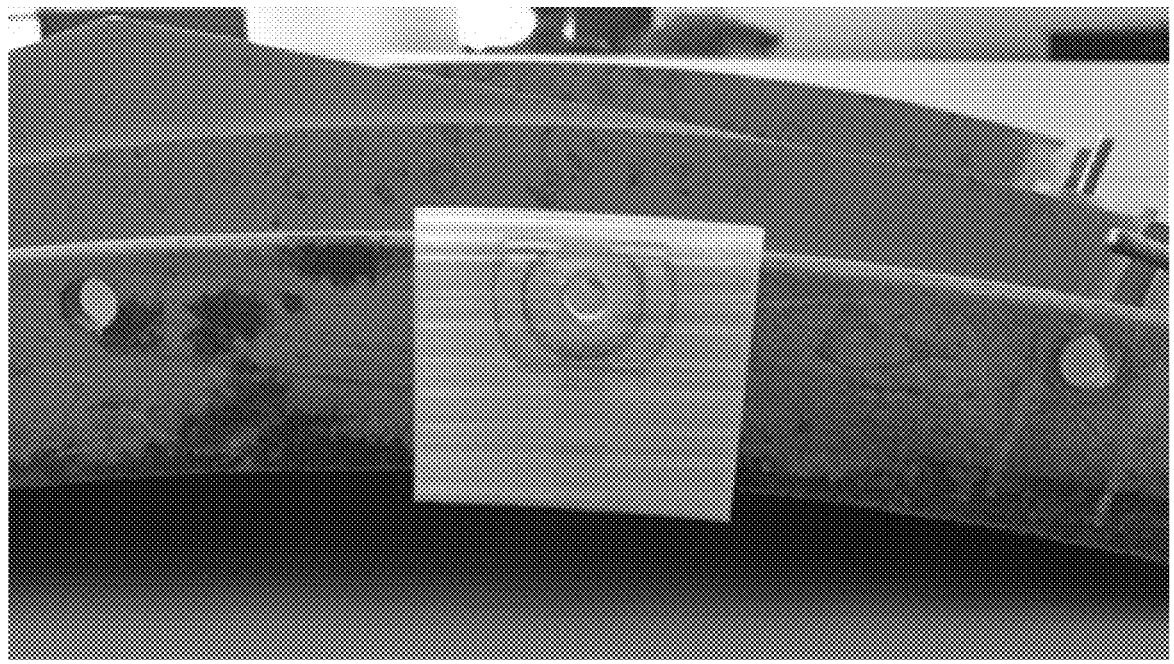
FIG. 5A is a photograph illustrating a front view of an assembly including an example tool and a substrate.
Figure 5B:
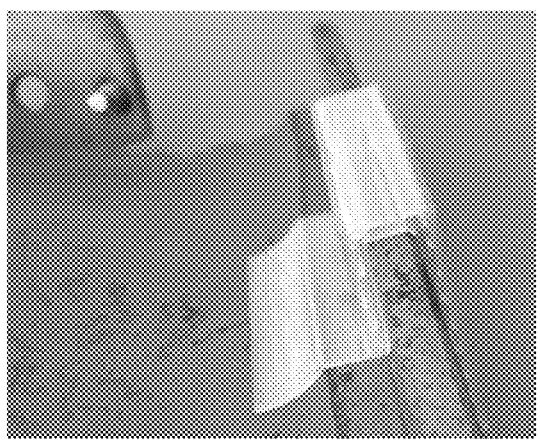
FIG. 5B is a photograph illustrating a perspective view of the assembly of FIG. 5A.

A translucent tool was fabricated using additive manufacturing (3D printing). FIG. 5A is a photograph illustrating a front view of an assembly including an example tool and a substrate. FIG. 5B is a photograph illustrating a perspective view of the assembly of FIG. 5A. The substrate included an engine front-frame assembly including magnesium.

Example 3

Figure 6:
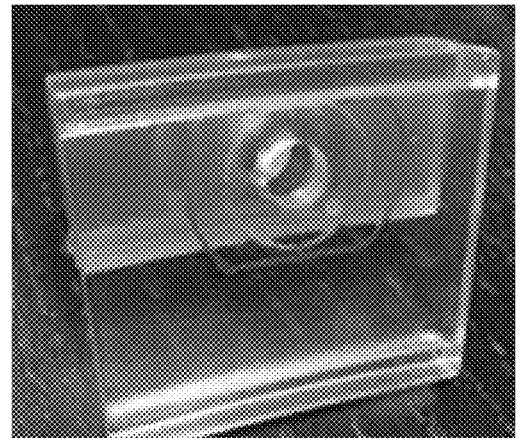
FIG. 6 is a photograph illustrating a perspective view of an assembly including an example tool.

A substantially transparent tool was fabricated using additive manufacturing (3D printing). FIG. 6 is a photograph illustrating a perspective view of an assembly including an example tool.

Various examples have been described. These and other examples are within the scope of the following claims.

The invention claimed is:

1. A tool comprising:
   a body configured to be secured to a substrate; and
   a template on or in the body, wherein the template comprises:
      first markings indicating a boundary of a nominal material-removal region; and
      second markings indicating a boundary of a maximum material-removal region,
      wherein the maximum material-removal region is larger than the nominal material-removal region, and
      wherein the maximum material-removal region defines a sacrificial region of the tool.

2. The tool of claim 1, wherein the body defines one or more windows defining the first markings of the template.

3. The tool of claim 1, wherein one or both of the nominal material-removal region and the maximum material-removal region are translucent or transparent.

4. The tool of claim 1, wherein the body is translucent or transparent.

5. The tool of claim 1, wherein the body comprises at least one of plastic, wood, glass, rubber, paper, metal, non-woven material, or a fabric.

6. The tool of claim 1, wherein the nominal material-removal region is configured to substantially align with a nominal periphery of an aperture defined by the substrate when the body is secured to the substrate.

7. The tool of claim 1, further comprising a clip configured to secure the body to the substrate.

8. The tool of claim 7, wherein the clip comprises at least one magnet configured to secure the body to the substrate.

9. An assembly comprising:
   a substrate defining an aperture, wherein a region of the substrate adjacent the aperture exhibits corrosion; and
   a tool, wherein the tool comprises:
      a body secured to the substrate, and
      a template on or in the body, wherein the template comprises:
         first markings indicating a boundary of a nominal material-removal region; and
         second markings indicating a boundary of a maximum material-removal region,
         wherein the maximum material-removal region is larger than the nominal material-removal region, and
         wherein the maximum material-removal region defines a sacrificial region of the tool.

10. The assembly of claim 9, wherein the body defines one or more windows defining the first markings of the template.

11. The assembly of claim 9, in wherein one or both of the nominal material-removal region and the maximum material-removal region are translucent or transparent.

12. The assembly of claim 9, wherein the body is translucent or transparent.

13. The assembly of claim 9, wherein the body comprises at least one of plastic, wood, glass, rubber, paper, metal, non-woven material, or a fabric.

14. The assembly of claim 9, wherein the tool further comprises a clip securing the body to the substrate.

15. The assembly of claim 14, wherein the clip comprises at least one magnet securing the body to the substrate.

16. The assembly of claim 9, wherein the substrate comprises at least one of metal, alloy, glass, ceramic, or plastic.

17. The assembly of claim 9, wherein the substrate comprises a jet engine front frame.

18. A method comprising:
   securing a body of a tool to a substrate, wherein the substrate defines an aperture, and wherein the tool defines a template on or in the body, wherein the template comprises:
      first markings indicating a boundary of a nominal material-removal region; and
      second markings indicating a boundary of a maximum material-removal region,
      wherein the maximum material-removal region is larger than the nominal material-removal region, and
      wherein the maximum material-removal region defines a sacrificial region of the tool;
   substantially aligning the nominal or the maximum material-removal region defined by the template with a respective nominal or a respective maximum periphery of the aperture; and
   removing material from the substrate only from a region defined by the nominal or maximum material-removal region.

19. The tool of claim 1, further comprising an extended lip configured to conform to a surface of the substrate.

20. The tool of claim 1, wherein the first markings comprise an edge of one or more windows defining the nominal material-removal region.

* * * * *